(No Model.)

F. C. McDONALD.
LOCK FOR BICYCLES.

No. 601,856. Patented Apr. 5, 1898.

WITNESSES:
Howard A. Redfield
Geo. H. Longard

INVENTOR:
Fred C. McDonald
BY Casper L. Redfield
ATTORNEY.

THE NORRIS PETERS CO., PHOTO-LITHO., WASHINGTON, D. C.

UNITED STATES PATENT OFFICE.

FRED COFFIN McDONALD, OF CHICAGO, ILLINOIS.

LOCK FOR BICYCLES.

SPECIFICATION forming part of Letters Patent No. 601,856, dated April 5, 1898.

Application filed February 1, 1897. Serial No. 621,442. (No model.)

*To all whom it may concern:*

Be it known that I, FRED COFFIN MCDONALD, a citizen of the United States, residing at Chicago, in the county of Cook and State of Illinois, have invented certain new and useful Improvements in Locks for Bicycles, of which the following is a specification.

The object of my invention is to provide a device that will not only lock the wheel against being used, but will at the same time prevent the front wheel from turning on its handle-bar axis.

Figure 1:
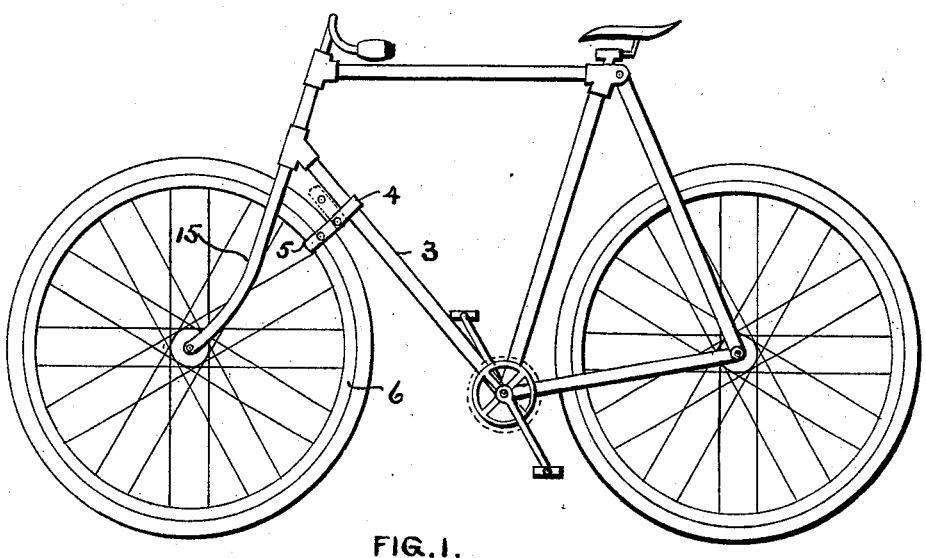
Figure 2:
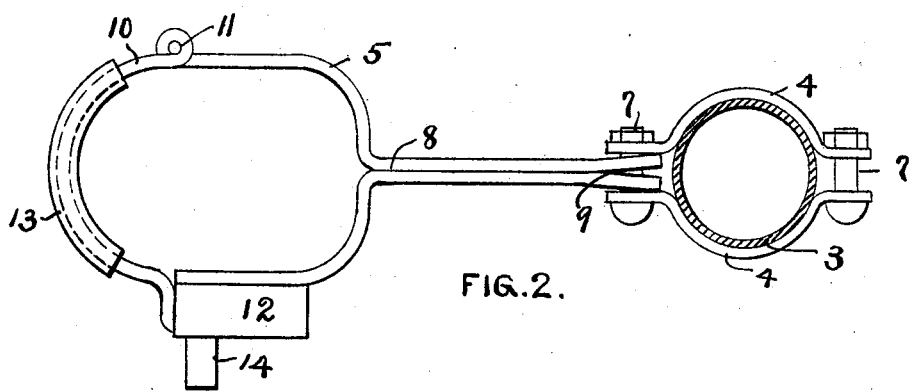

In the drawings, Figure 1 is a side elevation of a bicycle, showing the manner in which the lock is attached; and Fig. 2 is an enlarged plan of the lock.

In the said drawings, 3 is a part of a bicycle-frame, 4 is a portion of the lock connected to the frame, and 5 the portion of the lock that embraces the rim and tire of the front wheel 6. The portion 4 is in the form of a clamp having two halves held together by the bolts 7. The part 5 is in the form of a fork for embracing the rim and tire of the wheel, the two prongs of which unite at 8, where they are brazed or riveted together. At 9 these two pieces again separate into a fork which is held by the bolt 7 between the halves of the clamp 4. The fork at 9 has an initial spring-tension outward that keeps it in frictional contact with the halves 4 when clamped on the tube 3 of the bicycle-frame. This construction makes the bolt 7 a pivot on which the arm 8 may be turned, and the friction between the spring-fork 9 and the halves 4 maintains it in whatever position placed.

A curved arm 10 is hinged at 11 to one of the arms 5 and is adapted to engage and be held by a lock 12 on the other arm 5. On the arm 10 is a rubber sleeve 13 to prevent said arm from marring the rim of the wheel, and on the lock 12 is a suitable projection 14, which renders that part too wide to pass through the fork 15 of the bicycle in case the lock should be disconnected from the tube 3.

In applying the lock it is clamped on the tube 3, as shown in Fig. 1, and when not in use as a lock it is turned up into the position shown by the dotted lines. It will be held in this position when the bicycle is being ridden by the friction between the fork 9 and the halves 4. When it is desired to lock the bicycle, the arm 10 is turned on its hinge 11 so as to leave the fork 5 open, when the said fork may be depressed to embrace the rim and tire of the wheel 6 and the arm 10 closed around said rim and tire and secured by the lock 12. When in this position, the wheel 6 is not only prevented from turning on its shaft, but also from turning on its steering-axis.

What I claim is—

In combination with the frame of a bicycle, a clamp consisting of two halves adapted to embrace a portion of said frame and provided with bolts for securing it thereto, an arm consisting of two pieces brazed or riveted together and terminating in a fork adapted to embrace the rim of a wheel of said bicycle, a second and lesser fork on the other end of said arm pivoted to one of the bolts of said clamp and provided with means for giving it a frictional contact with the halves of said clamp, a shackle-arm pivoted to one branch of said first-mentioned fork and having its free end adapted to engage the other branch, and a lock on said other branch for securing the free end of said shackle-arm.

FRED COFFIN McDONALD.

Witnesses:
CASPER L. REDFIELD,
HOWARD A. REDFIELD.